(12) United States Patent
Pageau

(10) Patent No.: US 7,276,551 B2
(45) Date of Patent: Oct. 2, 2007

(54) CEMENT COMPOSITION

(76) Inventor: Jean-Roch Pageau, 476 rue Ste Thérese, Beauport, Québec (CA) G1B 1C8

( * ) Notice: Subject to any disclaimer, the term of this patent is extended or adjusted under 35 U.S.C. 154(b) by 367 days.

(21) Appl. No.: 10/819,081

(22) Filed: Apr. 6, 2004

(65) Prior Publication Data

US 2005/0222302 A1   Oct. 6, 2005

(51) Int. Cl.
*C04B 26/06* (2006.01)
*C04B 26/04* (2006.01)
*C04B 26/02* (2006.01)

(52) U.S. Cl. .................. 524/501; 524/5; 524/502; 524/493; 524/450

(58) Field of Classification Search ............. 524/5, 524/501, 502, 493, 450
See application file for complete search history.

(56) References Cited

U.S. PATENT DOCUMENTS 4,525,500 A * 6/1985 Lynn .................... 524/5
5,352,288 A * 10/1994 Mallow ................ 106/605
6,926,769 B2 * 8/2005 Drozd et al. .......... 106/696

FOREIGN PATENT DOCUMENTS

| JP | 07267703 A | * | 10/1995 |
| JP | 2002080254 A | * | 3/2002 |
| WO | WO 2083593 A1 | * | 10/2002 |

* cited by examiner

*Primary Examiner*—David W. Wu
*Assistant Examiner*—Satya B. Sastri
(74) *Attorney, Agent, or Firm*—Goudreau Gage Dubuc

(57) ABSTRACT

The present invention relates to a novel cement composition. This cement may be combined with a number of different products, including residual materials such as polystyrene, glass, cork, fiberglass, cellulose fibers, wood fibers and wood shavings, as well as with minerals or compositions such as zonolite or vermiculite. The resultant concrete exhibits physical and chemical characteristics that make it suitable for use in construction projects, including resistance to freeze-thaw cycles.

4 Claims, No Drawings

CEMENT COMPOSITION

FIELD OF THE INVENTION

The present invention relates to a novel cement composition. The composition of this cement makes it suitable for combination with a number of different products, including residual materials such as polystyrene, glass, cork, fiberglass, cellulose fibers, wood fibers and wood shavings, as well as with minerals or compositions such as zonolite or vermiculite.

BACKGROUND OF THE INVENTION

In cement and concrete technology, considerable effort has been devoted to developing high-strength materials with increased durability.

Cement-based materials are extremely complex substances containing inorganic, organic, solid, liquid, crystalline and amorphous components. Their properties depend upon permeability, porosity, dimensional stability, mechanical strength and the nature of the bonds between the numerous components. Interfacial investigations have resulted in a better understanding of the compositional and microstructural changes on the durability and properties of cement-based materials, allowing for innovation in this field.

Portland cement concrete, which is a composite material, is currently the most widely used manufactured material. Based on observations worldwide, the future of concrete looks promising because it offers suitable engineering properties at low cost combined with energy-saving and ecological benefits. Despite this, there are notable limitations to the use of cement, since it has low strain capacity and is therefore a brittle material.

More recently in the history of cement, the use of residual materials in cement-based composites such as silica fume, slag, fly ash and polymers, among others, has stirred an even greater interest in cement technology. For example, rubber tires have been successful reused as an addition to cement paste. The use of such residual materials in cement compositions not only results in new products with interesting properties, but greatly aids in eliminating environmental waste.

The flurry of activity in cement technology is indicative of a widespread interest for cost effective yet strong and durable concretes that may be tailored for use in a number of different applications. The present invention seeks to meet this and other needs.

OBJECTS OF THE INVENTION

The general object of the present invention is therefore to provide a new cement composition. This composition is suitable for combination with recycled materials, such as polystyrene.

SUMMARY OF THE INVENTION

In accordance with the present invention, there is provided a novel cement composition comprising a binding agent and cement. This novel cement composition may additionally include other materials so as to create concrete products that are suitable for various applications. The resultant concrete has desirable physical characteristics, such as the ability to maintain its integrity (by being resistant to scaling or chipping, for example) through dozens of freeze-thaw cycles. It serves the additional ecological purpose of eliminating waste that is too often relegated to landfill sites.

Composition of Binding Agent

1—An acrylic polymer emulsion;

2—A vinyl acetate/ethylene copolymer emulsion; and

3—Water added to the first two components, above. The volume of water to be added will range from a ratio of approximately 1:1 to approximately 3:1 measured relative to the volume of the first two components.

The mixture of the three components will have a pH of between approximately 6 and 8 for optimal results.

Cement

1—Three (3) parts by volume of Portland-type cement; and

2—Seven (7) parts by volume of an inorganic aggregate, such sand, silica or similar substances, or ultra-fine particles currently available on the market, having a maximum size of approximately 80 Mesh.

Combining the binding agent with the cement results in an inert concrete upon water evaporation. Recycled materials, such as expanded polystyrene particles, for example, may be added to the cement/concrete binding agent mixture in a proportion that is up to approximately 3 times the volume of the cement/concrete binding agent mixture to create a variety of concrete products.

The cement/binding agent mixture may be combined with other types of residual materials, according to need or demand. The concrete resulting from the combination of the cement/binding agent mixture has physical properties that demonstrate an excellent adhesion to a variety of residues such as glass, cork, fiberglass, cellulose fibers, wood fibres, wood shavings, etc. It may also be combined with minerals or compositions such as zonolite or vermiculite. The final composition will depend on the required characteristics of the concrete, aggregates of different sizes being added for different purposes, as known to those of skill in the art.

The present invention further includes the use of the novel cement composition in a number of applications. For example, it may be molded to prepare panels that are suitable for the construction of walls.

Other objects, advantages and features of the present invention will become more apparent upon reading of the following non restrictive description of preferred embodiments thereof, given by way of example only with reference to the accompanying drawings.

DESCRIPTION OF THE PREFERRED EMBODIMENTS

Definitions:

Unless otherwise specified, the terms used in the present application have the meanings that a person of skill in the art would normally attribute to them.

DETAILED DESCRIPTION

The present invention relates to a novel cement composition comprising a binding agent and cement. It may additionally comprise a filling material, including recycled materials, such as polystyrene, glass, cork, fiberglass, cellulose fibers, wood fibers, wood shavings, etc., and minerals or compositions, such as zonolite or vermiculite.

Composition of Binding Agent
1—An acrylic polymer emulsion;
2—A vinyl acetate/ethylene copolymer emulsion; and
3—Water added to the first two components, above. The volume of water to be added will range from a 1:1 ratio to a 3:1 ratio measured relative to the volume of the two components.

The mixture of the three components will have a pH of between approximately 6 and 8 for optimal results.

Cement
1—Three (3) parts by volume of Portland-type cement; and
2—Seven (7) parts by volume of an inorganic aggregate, such sand, silica or similar substances, or ultra-fine particles currently available on the market, having a maximum size of approximately 80 Mesh.

Combining the binding agent with the cement results in an inert concrete upon water evaporation. Recycled materials, such as expanded polystyrene particles, for example, may be added to the cement/concrete binding agent mixture in a proportion that is up to approximately three (3) times the volume of the cement/concrete binding agent mixture to create a variety of concrete products.

The cement/binding agent mixture may be combined with other types of residual materials, according to need or demand. The concrete resulting from the combination of the cement/binding agent mixture has physical properties that demonstrate an excellent adhesion to a variety of residues such as glass, cork, fiberglass, cellulose fibers, wood fibres, wood shavings, etc. It may also be combined with minerals or compositions such as zonolite or vermiculite. The final composition will depend on the required characteristics of the concrete, aggregates of different sizes being added for different purposes, as known to those of skill in the art.

The cement composition of the present invention may be used in a number of applications where cement has been traditionally used. Interestingly, when recycled polystyrene which has been shredded is added to the cement/binding agent described above, the product is a lightweight concrete that is sturdy yet malleable enough that it can be molded into various shapes to suit specific purposes. For example, the cement/binding agent/polystyrene concrete can be converted into slabs that can be used in building construction.

EXAMPLE 1

Preparation of a Cement Composition

Binding Agent
A binding agent was prepared by combining two (2) volumes of Rhoplex™ AC-2829 acrylic polymer emulsion (52-54% solid by weight, residual monomers<0.05, aqueous ammonia 1336-21-6 0.2 Max, water 7732-18-5 from 46-48%) with one (1) volume of Airflex™ 526BP vinyl acetate/ethylene copolymer emulsion (<0.01 2-methyl-4-isothiazolin-3-one, 40-60% vinyl acetate/ethylene copolymer, 40-60% water). Water was added in a quantity approximately equal to the volume of the combined solution of the acrylic polymer and the vinyl-acetate/ethylene copolymer emulsions. (It was noted experimentally that a volume of water approximately equivalent to 1-3 times the volume of the combined acrylic polymer emulsion and vinyl-acetate/ethylene copolymer emulsion can be added, depending on the desired characteristics of the final concrete product.).

The final binding agent solution had a pH of approximately 6.5-7.5.

Cement
Three (3) parts by volume of Portland cement were combined with seven (7) parts by volume of an inorganic aggregate, such sand, silica or similar substances, or ultra-fine particles currently available on the market, having a maximum size of approximately 80 Mesh.

Combining the binding agent with the cement resulted in an inert concrete upon water evaporation.

EXAMPLE 2

Preparation of a Cement Composition Containing Recycled Expanded Polystyrene (EPS)

The cement composition of Example 1 was combined with shredded recycled expanded polystyrene (EPS). It was determined experimentally that a volume of the cement composition can be combined with up to approximately three volumes of EPS.

Samples of concrete produced in this manner were subjected to freeze-thaw cycles to measure their durability. In one test, the concrete was found not to flake or scale after 15 freeze-thaw cycles. In another test, the concrete was found to have remained intact even after having been subjected to 110 freeze-thaw cycles.

Although the present invention has been described hereinabove by way of preferred embodiments thereof, it can be modified without departing from the spirit, scope and nature of the subject invention, as defined in the appended claims.

What is claimed is:

1. A cement composition consisting of a binding agent, a cement and a filling material,
  said binding agent consisting of:
    i. an acrylic polymer emulsion containing between 52 and 54% solid weight;
    ii. a vinyl acetate/ethylene copolymer emulsion containing between 40 and 60% solid weight; and
    iii. water, added in a ratio of 1:1 to 3:1 measured relative to the volumes of the acrylic polymer emulsion and vinyl acetate/ethylene copolymer emulsion; said mixture resulting having a pH between 6 and 8; and said cement consisting of:
    iv. three (3) parts, by volume of said binding agent, of a Portland cement; and seven (7) parts by volume of said binding agent, of an inorganic aggregate selected from the group consisting of sand and-silica with a maximum size of 80 Mesh.

2. A cement composition as defined in claim 1, wherein said filling material comprises at least one of: residual materials and mineral materials.

3. A cement composition as defined in claim 2, wherein said residual materials are selected from the group consisting of: polystyrene, glass, cork, fibreglass, cellulose fibers, wood fibers and wood shavings.

4. A cement composition as defined in claim 2, wherein said filling material comprises one of: i) zonolite and ii) vermiculite.

* * * * *